United States Patent

Herter

[15] 3,673,356

[45] June 27, 1972

[54] LOOP MONITOR CIRCUIT

[72] Inventor: Eberhard Herter, Stuttgart, Germany

[73] Assignee: International Standard Electric Corporation, New York, N.Y.

[22] Filed: Sept. 5, 1969

[21] Appl. No.: 855,721

[30] Foreign Application Priority Data

Sept. 19, 1968 Germany ....................P 17 62 897.6

[52] U.S. Cl. ....................179/175, 179/18 FA
[51] Int. Cl. ....................HO4m 1/24
[58] Field of Search ....................179/175, 175.1, 18 FA

[56] References Cited

UNITED STATES PATENTS

| | | | |
|---|---|---|---|
| 1,652,241 | 12/1927 | Hall | 179/175.1 |
| 3,363,067 | 1/1968 | Seaver | 179/175.1 |
| 2,731,514 | 1/1956 | Oberman | 179/18 FA |
| 2,835,740 | 5/1958 | Heetman | 179/18 FA |
| 3,129,289 | 4/1964 | Seemann | 179/18 FA |
| 3,156,778 | 11/1964 | Cirone | 179/18 FA |
| 3,525,816 | 8/1970 | Herter | 179/18 FA |

*Primary Examiner*—William C. Cooper
*Assistant Examiner*—Douglas W. Olms
*Attorney*—C. Cornell Remsen, Jr., Walter J. Baum, Percy P. Lantzy, J. Warren Whitesel, Delbert P. Warner and James B. Raden

[57] ABSTRACT

A circuit for determining the resistance of a loop by connecting the loop terminals through like resistances to respective poles of a voltage source. Each terminal is also connected to the opposite pole of the source through a voltage divider, the dividers being symmetrical. An evaluating device is bridged across taps in the voltage dividers, the taps being positioned to produce like resistive ratios in the dividers.

5 Claims, 9 Drawing Figures

LOOP MONITOR CIRCUIT

This invention relates to circuit arrangements for monitoring and evaluating the loop condition and for differentiating between loop resistances on a telecommunication line. Other arrangements for performing these functions are shown in my co-pending applications now issued as U.S. Pat. No. 3,515,809 issued June 2, 1970, U.S. Pat. No. 3,525,816 issued Aug. 25, 1970, and U.S. Pat. No. 3,546,392 issued Dec. 8, 1970, assigned to the assignee hereof.

The line-loop is connected to the two poles of the source of a feed voltage. In each case, connection is made via a feed branch line incorporating a feed resistor. An evaluating device is connected via two evaluating branch lines to the line terminals. Each of the evaluating branch lines comprises a voltage divider which is connected via one resistor to the line terminal and via another resistor to a source of voltage, poled oppositely to the source of a feed voltage.

An advantage of these circuit arrangements is that they can be readily manufactured in the form of resistance networks on printed circuit cards or thick or thin film.

Unlike relay circuits, they have no movable parts and contain only passive elements.

The method of producing printed circuits or film circuits makes it possible to achieve the very accurate partial ratios necessary for symmetry. However, this does not ensure that the absolute resistance values are attained. The absolute values are usually provided in a further adjusting process. Whereas, the condition of symmetry is necessary due to the influence of longitudinal interference voltages, the absolute resistance values of the evaluating circuit influence the balance for any given loop terminal. Furthermore, balance is affected by deviations from the rated value of the resistances of the loop connected to the line terminals of the evaluating circuit.

Assuming that any adjustment of the loop resistance connected to the line terminals is undesirable or virtually impossible, it is necessary to alter the resistance values in the evaluating circuit as a whole in order to maintain the condition of symmetry. However, this type of adjustment involves a considerable increase in the production cost of such evaluating circuits.

An object of the present invention is to provide balancing means within the evaluating circuit without altering the absolute values in the evaluating circuit or the loop resistance value connected to the line terminals.

According to the invention, this object is achieved by providing taps on the resistors of at least two of the branch lines in the evaluating circuit. Preferably at least one of these is an evaluating branch line. These taps have the partial ratio of the interference voltages applied to the line terminals. Preferably, at least one of these taps is in one of the evaluating branch lines. A fixed or variable two-terminal network is connected between two of these taps. There is a considerable advantage since the points, between which the fixed or variable two-terminal network is connected, are at the same potential with reference to the longitudinal interference voltages. Thus, it is possible to achieve a balance for a given threshold value by means of a single two-terminal network which, in its simplest form, may be an ohmic resistor.

In certain cases, there may be a necessity for limiting the voltage applied to the evaluating device to a predetermined value. If so, taps are provided on the resistors connected to the line terminals and the resistors connected to the source of an oppositely poled voltage in the two evaluating branch lines. A voltage-limiting resistor is connected between the two taps of each pair of taps at the same partial ratio. These voltage-limiting resistors are conveniently asymmetrical when conducting, and they are antiparallel to each other. In this way, there is a defined limitation of the voltage applied to the evaluating device when the specified threshold of the loop resistance is exceeded and when the loop resistance falls short of said threshold.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
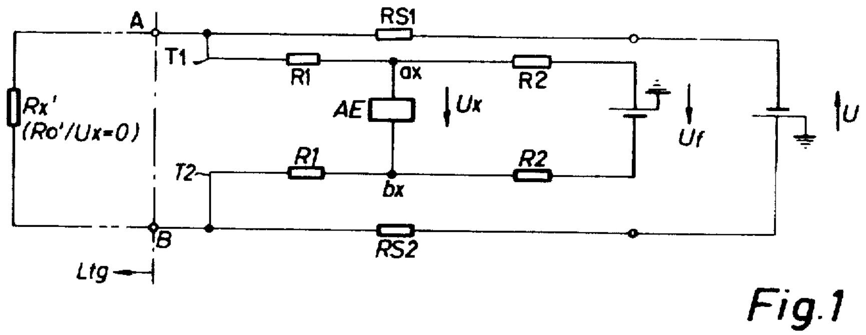
FIG. 1 shows the basic circuit of the evaluating circuit.

The evaluating circuit shown in FIG. 1 schematically has two feed branch lines RS1 and RS2. These branches incorporate the two feed resistors bearing the same designations and having the same resistance values. The feed branch lines are connected at one end to the source of feed voltage U and at the other end to the two line terminals A and B. Also connected to the line terminals are the two identical evaluating branch lines T1 and T2. These branches are in the form of voltage dividers having the same partial ratio $k$. The evaluating device AE is inserted between the resistor taps $ax$ and $bx$. The evaluating device AE may be of the type disclosed and described using the same designation AE in U.S. Pat. No. 3,525,816 noted previously.

If it is assumed that terminals AB represent the line-loop terminals of a subscriber station in a telecommunications system, resistors RS1, RS2 and the feed branch lines in which they appear, represent the impedance of the lines to the terminals.

The ends of the evaluating branch lines are connected to a source of voltage $U_f$ of opposite polarity, with respect to the polarity of the source of feed voltage U. The function of this source of voltage $U_f$ may be assumed by the feed voltage source U if the evaluating branch lines T1 and T2 are connected, via the resistor R2 in each case, to the points of connection between the feed branch lines RS2 and RS1 respectively and the feed voltage source U. The line-loop is connected to the evaluation branch lines at the terminals A and B.

Not shown in the drawings are the equivalent voltage sources of the longitudinal interference voltages $V_1$ induced in each wire of the line-loop. These interference voltages cannot influence the measurement due to the symmetrical construction of the evaluating circuit and the equal partial ratios $k$ in the evaluating branch lines T1 and T2. As a result, equal proportions of the longitudinal interference voltage are applied to the terminals $ax$ and $bx$ of the evaluating device. The circuits for the longitudinal interference voltages are completed via capacitance to ground since grounded voltage sources are used in this case.

The absolute resistance values of the resistors in the evaluating circuit have the partial ratio $k$. The values of these resistors and the voltage source $U_f$, if used, are such that at a certain potential appears between the line terminals responsive to a certain loop condition. For example, this condition may occur responsive to the switching into circuit of a resistor $R'_x$ or a signal potential. The voltage $U_x$ at the evaluating device then assumes a predetermined value, such as 0 volts.

Assume that the values of the resistors R1 and R2 in the evaluating circuits T1 and T2 are large as compared with the values of the feed resistors RS1 and RS2. The equation for the voltage $U_x$ may then be stated in the following form:

$$U_x = (1-k)U_f - kU\frac{1}{1+\frac{2RS}{R'_x}}$$

This assumption is permissible because it has no qualitative effect on the results, and it simplifies the calculation.

From the above equation, it can be clearly seen there are various possibilities of maintaining the balance if there are deviations of the absolute resistance values within the evaluating circuit or of the loop resistance $R'_x$. However, any alteration of the partial ratio $k$ or adjustment of the absolute values of the resistors is undesirable since such adjustments increase production costs, since any such adjustment must involve all of the resistors in order to maintain symmetry. Alterations of voltage are equally undesirable.

Figure 5:
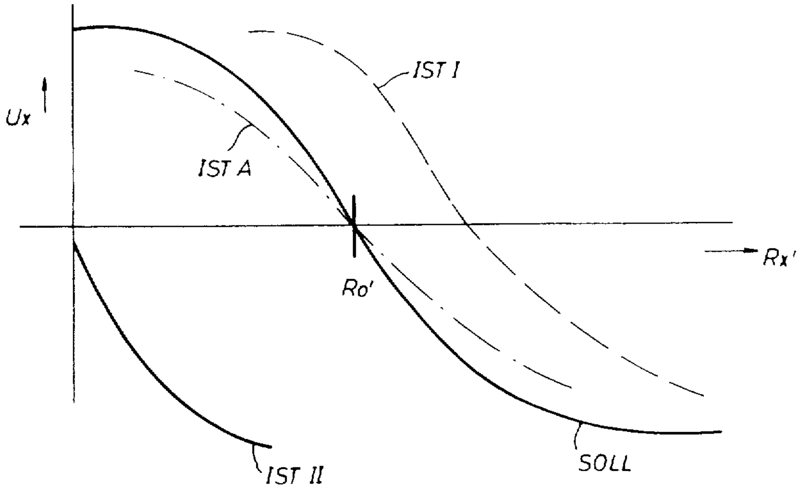
FIGS. 5 and 6 show graphs of the voltage at the terminals of the evaluating device plotted against the loop terminal resistance.

In FIG. 5 SOLL designates a characteristic curve of the voltage graph $U_x = f(R'_x)$ in which the voltage at the evaluating device passes through zero at the desired threshold $R'_0$. In a practical circuit, there must be provisions for tolerance effects which may, for example, cause the zero crossover to take place at a value $R'_x > R'_0$ (curve IST I).

Figure 2:
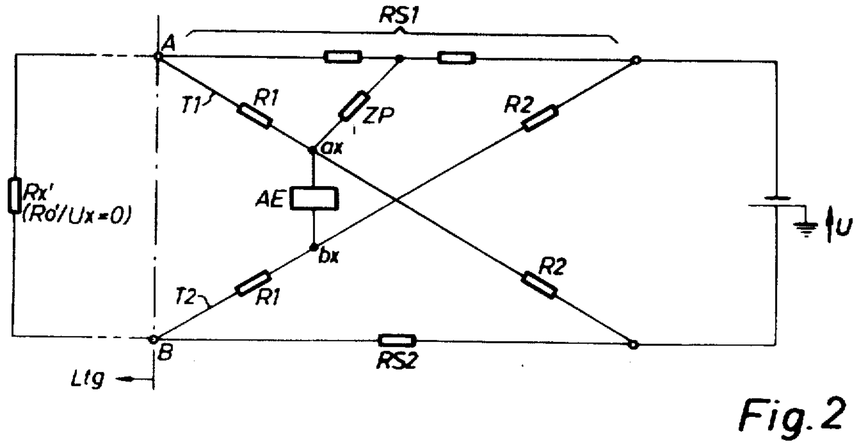
FIGS. 2 and 3 show two different ways of inserting a two-terminal network into the evaluating circuit.

FIG. 2 shows an evaluating circuit in which the voltage source $U_f$ is omitted. Instead, the evaluating branch lines are connected to the feed voltage source $U$ with a reversed polarity. The circuit shown in FIG. 2 (without the two-terminal network ZP) may have partial ratios, absolute resistance values, etc. such that the zero crossover of voltage $U_x$ takes place at a value $R'_x > R'_0$, as explained above with reference to FIG. 5. Reduction of the absolute resistance values in the evaluating circuit, at constant partial ratios, also leads to a displacement or shift of balance towards larger values of $R'_x$.

In the circuit arrangement shown in FIG. 2, the feed resistor RS1 is represented by two partial resistors having a tap between them. A two-terminal network ZP is inserted between this tap and the terminal *ax*, in the evaluating branch line T1. The potential at the terminal *ax*, and thus the voltage $U_x$ at the evaluating device, are additionally influenced. However, this may not disturb the symmetry obtaining with reference to the longitudinal interference voltages. Thus, if the partial ratio $k'$ for the division of the feed resistor RS1 is the same as the partial ratio $k$ for the evaluating branch line T1, the terminal *ax* in the evaluating branch line T1 and the tap in the feed branch line RS1 will both be at the same relative potential. Symmetry is maintained with reference thereto and the evaluation will not be affected by the longitudinal interference voltages.

An alternative is to divide the resistor RS2 in the same ratio $k' = k$, as described above, for the resistor RS1 and to insert the two-terminal network ZP between the resulting tap in the feed path RS2 and the terminal *bx* in the evaluating branch line T2. In FIG. 5, the curve IST A designates the balancing curve which results from the insertion of the two-terminal network. The insertion of a resistor will have a certain attenuating effect.

Figure 3:
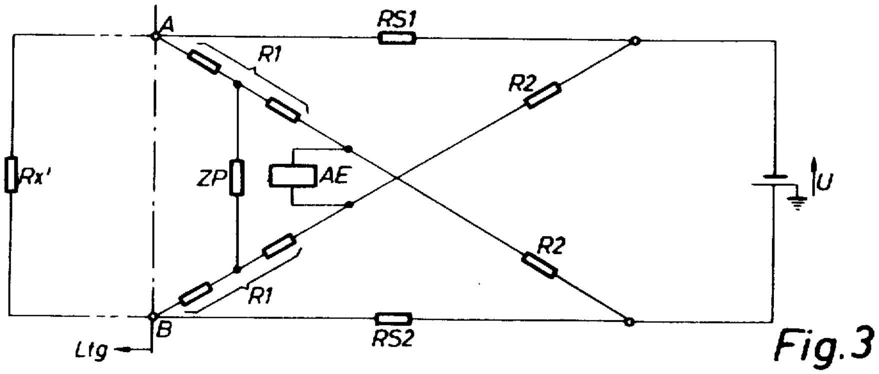

FIG. 3 shows another way of maintaining the balance. The two-terminal network ZP is inserted between two taps, one on each of the resistors R1 in the two evaluating branch lines T1 and T2. In this arrangement, the potentials at the terminals *ax* and *bx* are influenced. The qualitative effect is the opposite of that obtained in FIG. 2. There would be qualitative equivalence to the arrangement shown in FIG. 2 if a two-terminal network ZP is inserted between taps disposed at the same partial ratios on the resistors R2 in the two evaluating branch lines T1 and T2.

The above-described arrangements and effects rely on the assumption that the inserted two-terminal networks ZP are passive two-terminal networks, such as ohmic resistors, either having a fixed value or being in the form of variable resistors. The damping of sensitivity caused by the insertion of ohmic resistors may be compensated, if necessary, by the use of an evaluating device of appropriately increased sensitivity.

Figure 4:
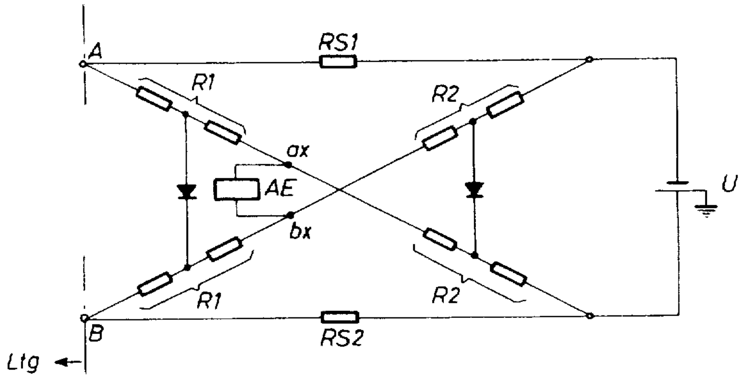
FIG. 4 shows a circuit arrangement for limiting the voltage applied to the terminals of the evaluating device.
Figure 6:
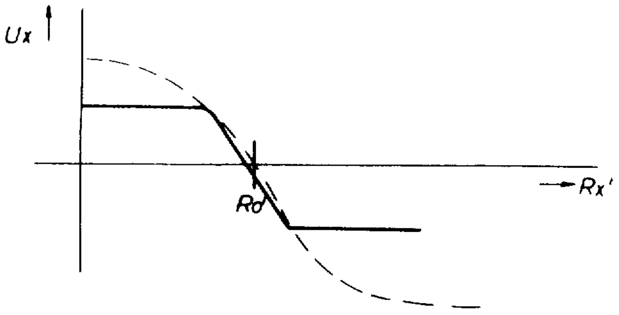

The arrangement shown in FIG. 4 serves to limit the voltage $U_x$ applied to the terminals ax and bx of the evaluating device AE. Each of the resistors R1 and R2 in each of the evaluating branch lines T1 and T2 is divided in a certain ratio. A first diode is inserted between the resulting taps provided between the two partial resistors of R1 in the two evaluating branch lines. A second diode is inserted between the two taps on the resistors R2. These two diodes are antiparallel to each other. The magnitude of the voltage is shown in the graph in FIG. 6 and is determined by the choice of diodes inserted and by the choice of the partial ratios in the divided resistors R1 and R2 in the two evaluating branch lines T1 and T2.

Figure 7:
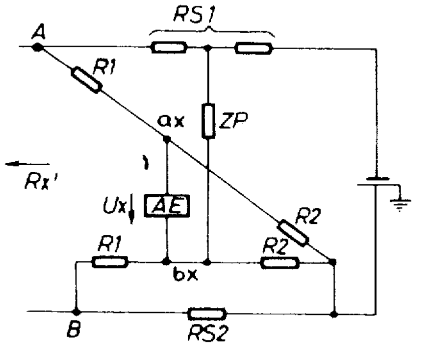
FIGS. 7 to 9 show further embodiments of the evaluating circuit.

The embodiment shown in FIG. 7 represents a particular form of the evaluating circuit shown in FIG. 1. One of the evaluating branch lines, in this case T2, is connected via its resistor R2, to the same potential of the feed voltage source as the feed branch line RS2. Since no additional voltage source $U_f$ is provided at the base of the evaluating branch lines, the evaluating branch line T1 is also connected to this potential via its resistor R2. The graph of the voltage at the terminals *ax* and *bx* in this evaluating circuit (without the two-terminal network) is designated IST II in FIG. 5. By placing a suitable two-terminal network ZP between the terminal bx at a partial ratio k and a tap in the feed branch line RS1 at the same partial ratio $k' = k$, it is also possible to achieve a voltage curve similar to that designated IST A in FIG. 5, in the present arrangement.

Figure 8:
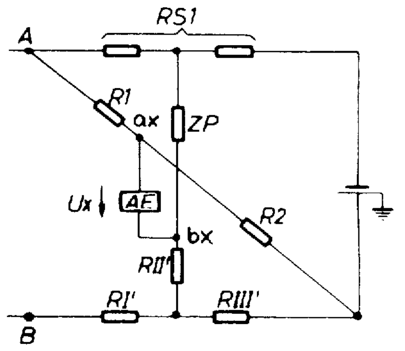

In the practical realization of such an evaluating circuit, the circuit arrangement shown in FIG. 7 may be converted as is shown in FIG. 8. This conversion is carried out on the principle of the well-known delta/star transformation. The resistors RI', RII' and RIII' have values which are particularly convenient from the production point of view. The operation of the evaluating circuit remains unchanged.

Figure 9:
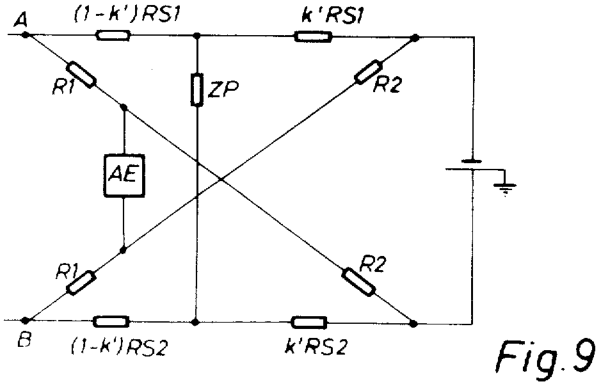

In the arrangement shown in FIG. 9, the two-terminal network ZP is disposed between taps located between the partial resistors of the resistors RS1 and RS2 of the two feed branch lines. The partial ratio $k'$ is the same in each case. Although an arrangement of this kind may be used to influence the balance, it is less advantageous since the two feed resistors have low resistance values as compared with the resistors in the evaluating branch lines T1 and T2. Consequently the two-terminal network must be appropriately chosen. Thus, there is an undesirably high additional load on the feed voltage source.

The present invention also embraces the possibility of inserting a two-terminal network in other ways or of combining the above-described measures. The insertion of additional networks is always made between points at the same partial ratio $k'$ with reference to the longitudinal interference voltages induced in both wires.

While the principles of the invention have been described above in connection with specific apparatus and applications, it is to be understood that this description is made only by way of example and not as a limitation on the scope of the invention.

I claim:

1. A circuit for evaluating the condition of a telephone loop and for differentiating between resistances of said loop, comprising a voltage source, first means connecting each pole of said source to a respective terminal of said loop, said first connecting means including substantially identical resistances in each connection between a pole and a terminal, second connecting means comprising a first and a second voltage divider, each divider being connected between a separate terminal and a pole of said source for poling the respective terminals contrary to the polarity derived through said first connecting means evaluating means, means connecting said evaluating means into each of said voltage dividers at like taps in said dividers, and a two-terminal network connected to said connecting means, at least one of said last mentioned connection being intermediately within one of said voltage dividers.

2. The circuit arrangement of claim 1, characterized in that taps are provided intermediately in each of said voltage dividers, said taps being positioned to dispose a like resistance between each resistance tap and said source in the respective dividers between which said two-terminal network is connected.

3. The circuit arrangement of claim 1, characterized in that taps are provided each voltage divider and a voltage-limiting resistance is connected between the two taps.

4. The circuit arrangement of claim 1, characterized in that one voltage divider together with one connecting means is connected via a resistance to one and the same line terminal, the said connecting means being connected with the second terminal of the same connecting means via another resistance, to one pole of the voltage source, said two-terminal network being connected between a tap located intermediately in said voltage divider and a tap at a point having like resistance ratio in the other connecting means.

5. The circuit arrangement of claim 1, characterized in that a delta circuit is formed by the resistances of one of the voltage dividers, the connecting means being connected in parallel thereto being resistance of an equivalent star circuit.

* * * * *